United States Patent [19]
Low et al.

[11] Patent Number: 5,276,300
[45] Date of Patent: * Jan. 4, 1994

[54] AC/DC POWERED MICROWAVE OVEN

[75] Inventors: Douglas W. Low, Essex; Neil C. Titcomb, Branford; Peter J. Kindlmann, Guilford, all of Conn.

[73] Assignee: International Marine Industries, Inc., Guilford, Conn.

[*] Notice: The portion of the term of this patent subsequent to Feb. 27, 2007 has been disclaimed.

[21] Appl. No.: 422,963

[22] Filed: Oct. 18, 1989

Related U.S. Application Data

[63] Continuation-in-part of Ser. No. 259,124, Oct. 18, 1988, Pat. No. 4,904,837.

[51] Int. Cl.$^5$ .............................................. H05B 6/66
[52] U.S. Cl. ...................... 219/10.55 B; 219/10.55 E; 219/10.55 D
[58] Field of Search ...................................... 219/10.55

[56] References Cited

U.S. PATENT DOCUMENTS

| | | |
|---|---|---|
| 4,471,422 | 9/1984 | Hierholzer, Jr. . |
| 4,488,057 | 12/1984 | Clarke . |
| 4,517,430 | 5/1985 | Slottag ........................ 219/10.55 B |
| 4,560,887 | 12/1985 | Schneider . |
| 4,667,075 | 5/1987 | Sakurai . |
| 4,719,326 | 1/1988 | Yoo .............................. 219/10.55 B |
| 4,742,442 | 5/1988 | Nilssen . |
| 4,904,837 | 2/1990 | Low et al. ..................... 219/10.55 B |

OTHER PUBLICATIONS

Advertisement for Powamate Microwave Cooking System by Powamate Ltd.
Advertisement (mailorder) for SM-11 Battery Operated Microwave by Peter Schiff Enterprises.
Advertisement entitled "Innovations in Marine Products" by Peter Schiff Enterprises for SM-11 Battery Operated 12 VCD Microwave Oven.
Installation Instructions for SM-11 Battery Operated 12 VDC Microwave Oven by Peter Schiff Enterprises.
Block Diagram (fig 3) Wiring Daigram for the SM-11 Microwave Oven by Schiff.
Microwave Oven Service Manual for Model DMR-504.

*Primary Examiner*—Philip H. Leung
*Attorney, Agent, or Firm*—St. Onge Steward Johnston & Reens

[57] ABSTRACT

A microwave oven is described suitable for use on transports where DC power is available. The microwave oven employs a first inverter to generate internal AC power that is then used to operate the microwave components other than the magnetron microwave source. The internal AC power is passed with relatively low current through the oven interlocks to activate and drive a power inverter that, through an additional output transformer winding, delivers high voltage power to the magnetron. In a preferred embodiment a relay, that is connected to sense when external AC power is available, causes an automatic switching that decouples the internal AC power from the power inverter to enable conventional operation from external AC line power. When external AC line power is no longer applied, the microwave oven automatically switches to operate from the available DC power. An efficient cooling fan is provided that is driven by a DC motor. The motor is provided DC power that is derived from a reverse coupling of AC line power through a transformer used at the output of the first inverter. During a DC power mode, the DC power available at a center tap of the primary winding of this transformer is used to drive the DC motor. Operating controls are described for the power inverter.

10 Claims, 6 Drawing Sheets

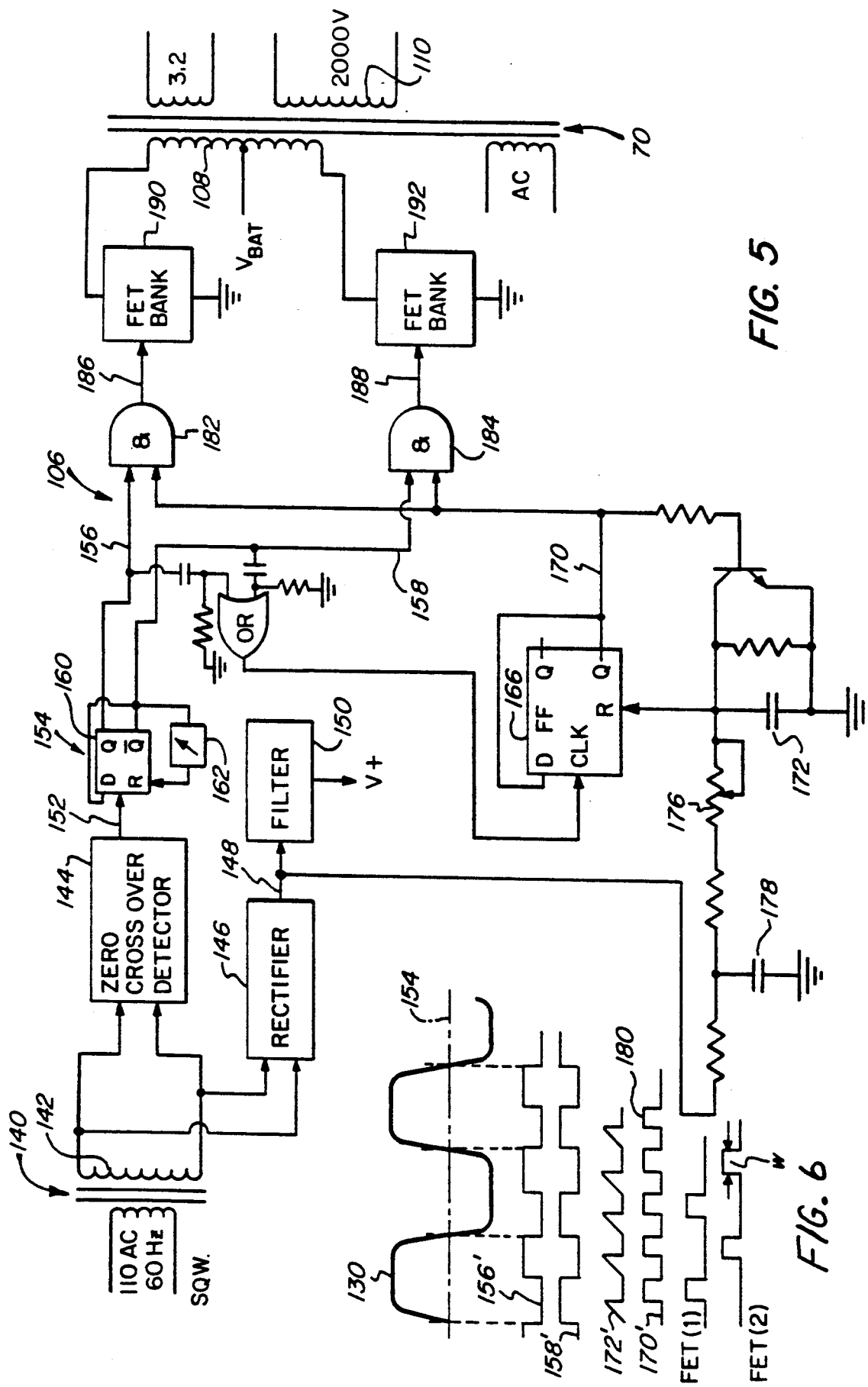

AC/DC POWERED MICROWAVE OVEN

This is a Continuation-In-Part of U.S. patent application Ser. No. 259,124 filed Oct. 18, 1988, now U.S. Pat. No. 4,904,837 and entitled AC/DC POWERED MICROWAVE OVEN.

FIELD OF THE INVENTION

This invention generally relates to microwave ovens and more specifically to microwave ovens for use with transports, such as boats, vehicles, and the like.

BACKGROUND OF THE INVENTION

Use of microwave ovens with power available on recreational vehicles has been proposed. U.S. Pat. No. 4,667,075 to Sakurai, for example, proposes powering the oven by using three-phase, AC power generated by a vehicle mounted generator.

Microwave ovens employ magnetrons which require high power for short periods of time. Typically 1 kw. or more of electrical power is needed for cooking food during intervals that usually range from one to seven minutes depending upon what needs to be heated. Such power demands currents that can approach 100 or more amperes from a 12 volt DC battery when that is the source of power for the microwave oven.

It is imperative in the use of microwave ovens that microwave energy not be allowed to escape. Extensive leakage controls are applied. One such control involves interlocks that sense when the oven door is opened and thus prevent operation of the magnetron. It is not practical to operate such interlocks while low voltage high current electrical power for the magnetron is being passed through At the typical DC input voltage of 12 volts used in cars, boats and other transports the electrical current is too high to safely pass through conventional microwave interlocks. The door operated switches would be likely to arc and present sufficient electrical resistance to overheat.

In view of the high power needs of a microwave oven, it is desirable to operate it from regular AC line voltage when that is available. This requires an ability to operate both from AC and DC power. In one known AC or DC powered microwave oven, the POWA-MATE, sold by E.C. Smith & Sons of Bedforshire, England, an inverter is used to generate the full AC power needed to operate the oven from a 24 volt DC source. This AC power is then applied through the oven interlocks to operate the magnetron. The oven is built on top of the inverter, and as a result, is large, cumbersome and expensive, and difficult to install on a boat with limited storage capacity.

In another DC powered microwave oven sold by Peter Schiff Enterprises from Cookeville, Tenn., a conventional microwave oven is converted to DC battery operation. An inverter is used to generate power for the magnetron. DC power is supplied through a high current fuse to a center-tapped winding of an output transformer as well as through thermostat switches, a door interlock and a timer-controlled switch to a printed circuit (PC) board and to a DC-powered fan and light. A 60 Hz. signal is generated on the PC board to operate a timer motor.

This type of microwave oven cannot operate from AC power, and appears to employ the interlocks in a manner that is different from conventional AC powered microwave ovens.

SUMMARY OF THE INVENTION

In a preferred microwave oven in accordance with the invention, either AC or DC power can be used to power the oven while the conventional interlock safety system of the oven is employed without alteration and with a relatively small amount of additional volume needed for the power inverter.

This is obtained with one microwave oven in accordance with the invention by including both low power and high power inverters. The low power inverter produces internal AC power that can be at line voltage and is connected through normally-available oven interlocks to drive the high power inverter, which then in turn provides the power needed for the magnetron when the oven is turned on. This internal AC line power is also coupled to operate conventional microwave oven components, such as its lamp, fan motor, and a digital control circuit if that is part of the microwave oven.

An automatically-operated switch enables powering of the oven from either external AC power or DC battery power.

Since, even when the oven is operated from DC battery power, internal AC line power is generated, the microwave oven's conventional operating components can be used. This enables use of standard production microwave ovens with relatively few alterations.

One such alteration is the addition of a primary center-tapped winding on the output transformer through which the high power inverter can generate the high voltage for the magnetron. Another change is the insertion of a relay-operated switch by which external AC power is sensed and causes an automatic disconnection from DC power when external AC power is applied and an automatic connection effective to enable DC powering of the oven when external AC power is no longer applied. Such changes can be conveniently implemented while substantially retaining the envelope of the conventional microwave oven.

Although for most uses adaptation to external AC line power is desired, a microwave oven in accordance with the invention can be powered solely from a DC battery.

When internal AC power is generated to drive auxiliary oven components such as its fan, the amount of AC power needed becomes too high to provide adequate cooling. Typically, a shaded pole motor is used to drive the fan and this, with its relatively low efficiency, demands too much AC power and would require too large an output transformer. With a DC powered microwave oven in accordance with the invention, the fan motor is an efficient DC motor and the power for that motor is derived from the battery during the DC power mode. During the AC power mode, DC power for the motor is obtained by way of a reverse use of an otherwise inactive output transformer used by the internal AC power source.

A connection is maintained between the secondary winding of the output transformer of the internal power source to the interlocks of the microwave oven during both DC and AC power modes. In the AC mode, the AC power line voltage is then also applied to the secondary winding to produce a primary winding voltage This voltage is rectified to provide DC motor power by the so-called "body diodes" that are an intrinsic part of the MOS FET semiconductor switches that drive this primary winding in the DC mode.

In the DC mode, the battery voltage available at the output transformer is used to drive the DC fan motor.

Since DC fan motor power is not supplied through the conventional oven circuitry and oven interlocks, a control circuit for the DC fan motor is provided. This maintains fan speed needed for cooling despite voltage fluctuations and responds to events in the oven control that might require fan motor shut-off.

It is, therefore, an object of the invention to provide a microwave oven that can be safely operated from DC power available on transports such as boats or vehicles while utilizing conventional microwave interlocks without substantial modification of a conventional oven. It is a further object of the invention to provide a safe, economically-manufactured microwave oven that can be powered from DC or AC power and automatically switches to available AC power.

These and other objects and advantages of the invention can be understood from the following description of a preferred embodiment shown in the drawings.

BRIEF DESCRIPTION OF DRAWINGS

FIG. 5 is a schematic block diagram for a power inverter used in the microwave oven of FIG. 4;

FIG. 6 is a timing diagram of waveforms generated in the power inverter shown in FIG. 5;

DETAILED DESCRIPTION OF DRAWINGS

Figure 1:
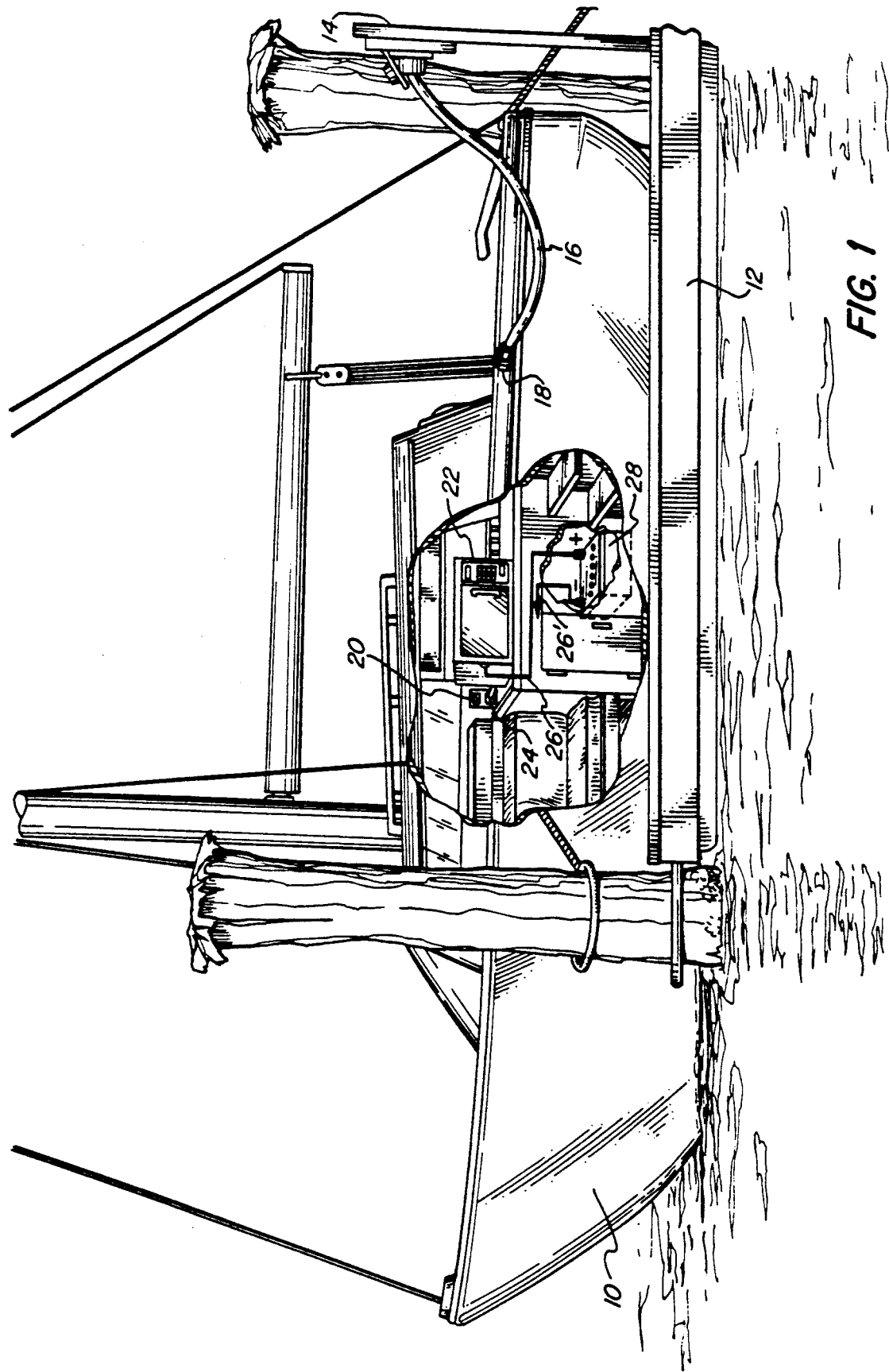
FIG. 1 is a side, partially cut-away, view of a sailboat type transport using a microwave oven in accordance with the invention.

With reference to FIG. 1, a transport such as a sailboat 10 is shown tied to a slip 12. It should be understood that the microwave oven can be used in different environments such as with vehicles, campers, or other locations where DC input power is available. Shore power is made available at a post 14 and connected by a cable 16 to a receptacle 18 to provide external AC line power at a conventional wall socket 20 inside the cabin near the galley. A microwave oven 22 in accordance with the invention is electrically connected to the external AC line power at socket 20 and by way of short cables 26, 26' to a DC battery 28.

Oven 22 is formed like a conventionally-known microwave oven, except for modifications in accordance with the invention. An important feature of microwave oven 22 is that it will automatically switch to shore power when that becomes available as shown in FIG. 1.

Figure 2:
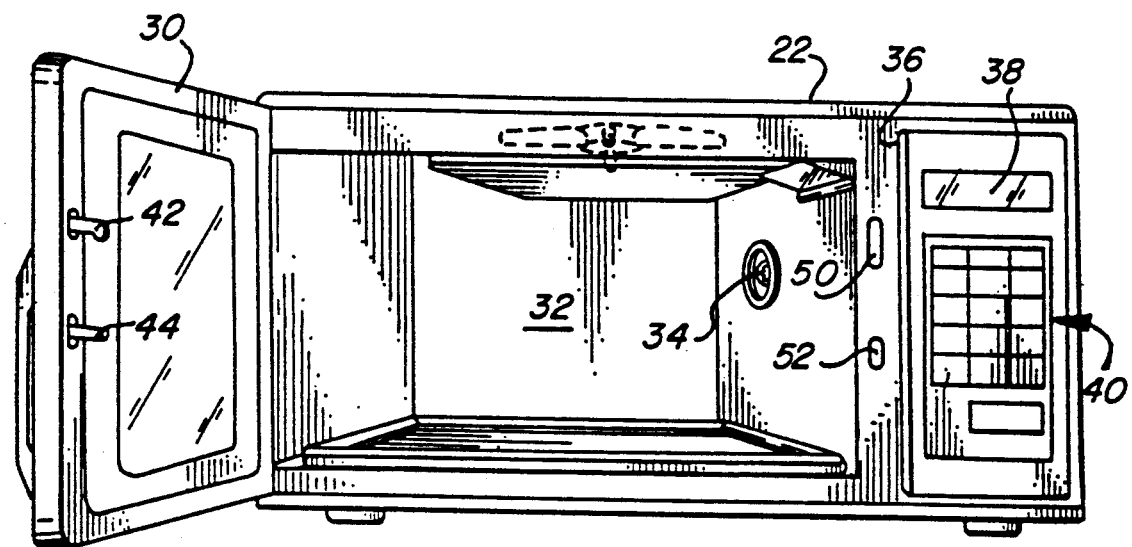
FIG. 2 is a front view in elevation of a microwave oven in accordance with the invention.
Figure 4:
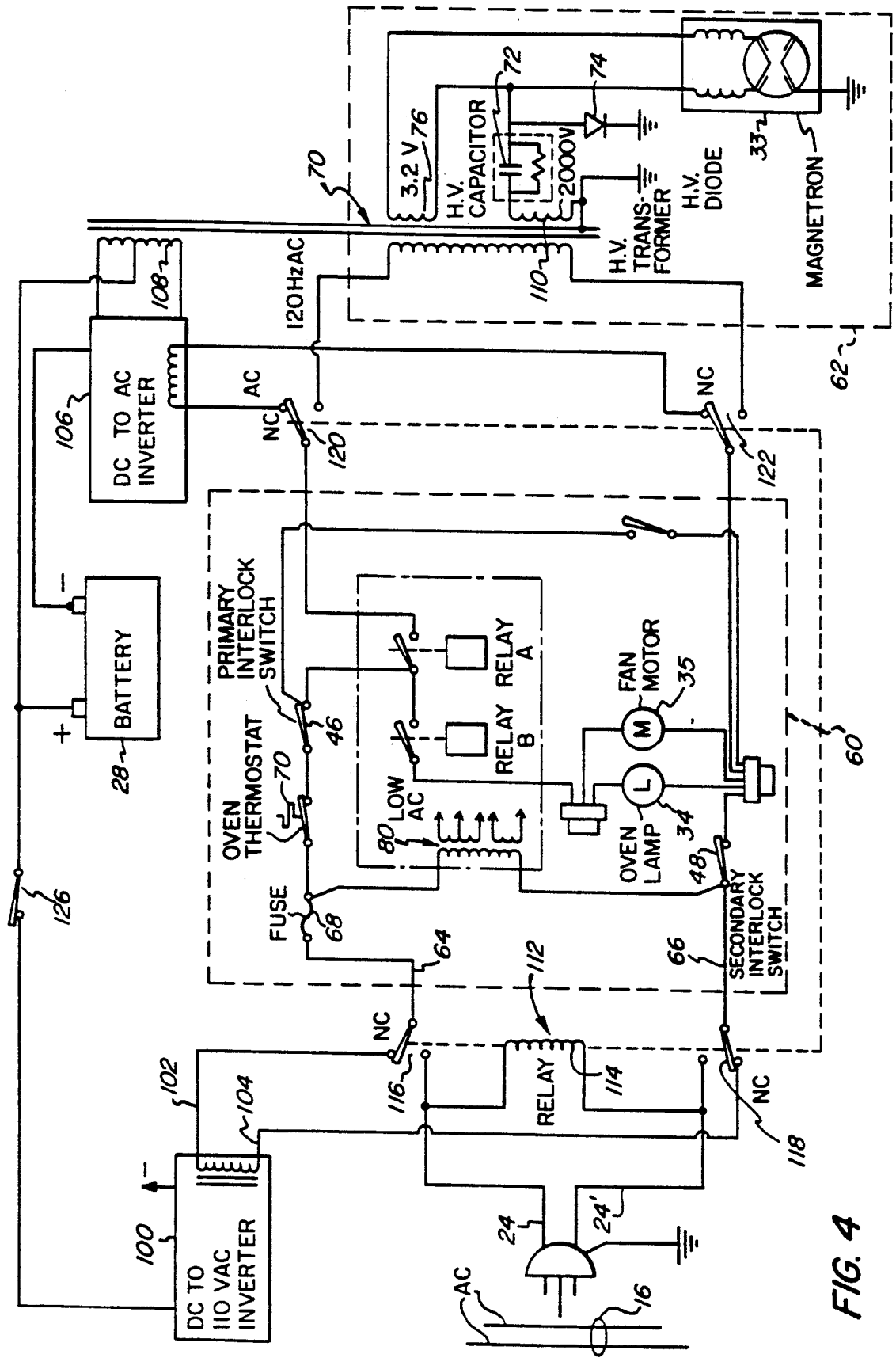
FIG. 4 is a schematic block diagram for the microwave oven of FIG. 2.

As illustrated in FIG. 2, microwave oven 22 has a door 30 to close a cooking cavity 32 that is exposed to microwave radiation from a magnetron 33 (see FIG. 4). A lamp 34 illuminates cavity 32 and a motor driven fan 35 (see FIG. 4) causes a circulation of air. A digital control 36 may be provided as illustrated with a display 38, control buttons 40 and a digital clock. The door 30 is provided with suitable levers 42, 44 that activate switches 46, 48 (see FIG. 4) inside recesses 50, 52. These switches 46, 48 serve as interlocks to interrupt magnetron power as soon as the door is cracked open, thus preventing leakage of microwave power from a partially-opened door. The microwave oven as shown in FIG. 2 is like the AC line powered model DMR-504 made by the Daewoo Company of Korea except for certain modifications as hereinafter described. Other conventional ovens may be used such as those that do not employ digital circuitry.

Figure 3:
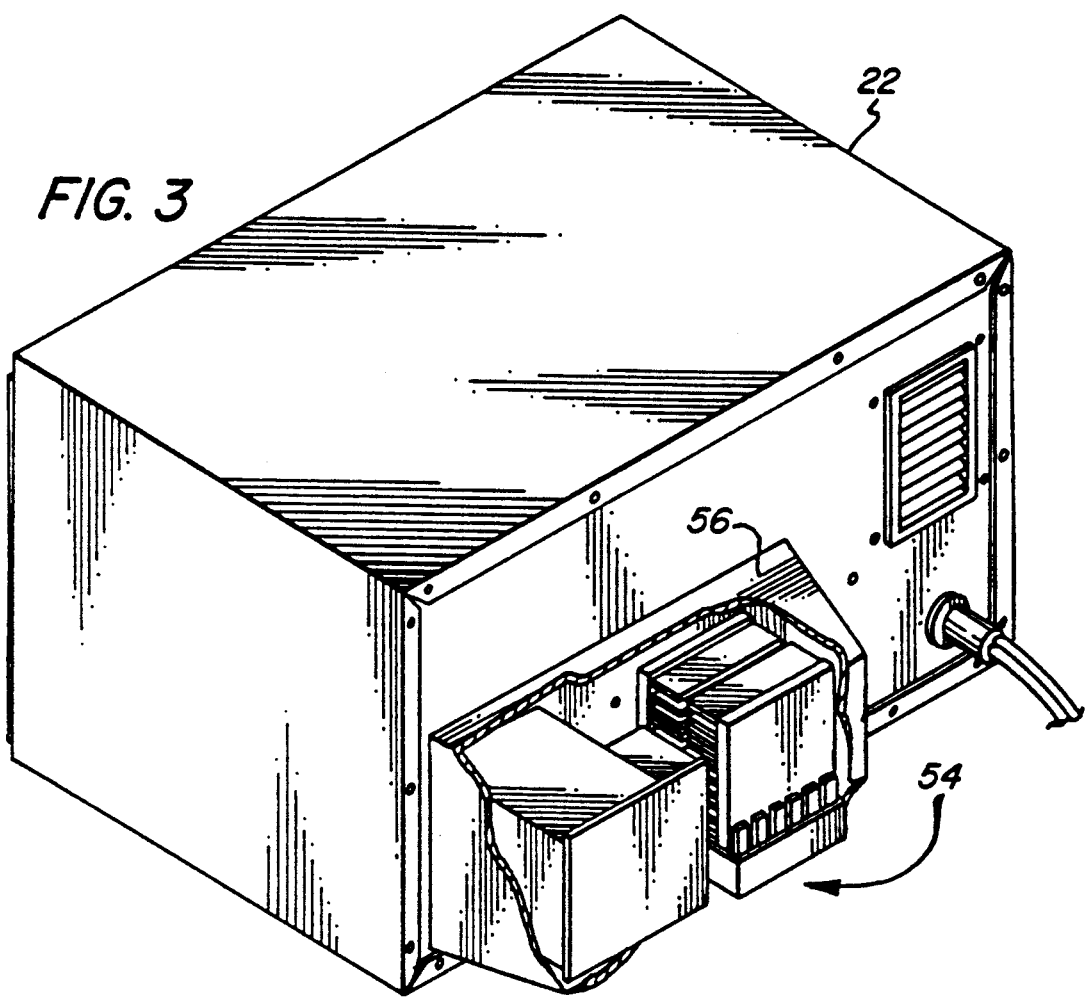
FIG. 3 is a rear perspective view of the microwave oven shown in FIG. 2.

FIG. 3 illustrates at 54 additional circuitry to enable the microwave oven to be powered from a DC source. The additional circuits occupy additional space provided inside an enclosure 56 that is attached to the rear of the microwave oven 22. As can be seen from FIG. 3, the envelope for the conventional microwave oven remains substantially unchanged by the addition of enclosure 56.

FIG. 4 shows an electrical circuit employed to operate microwave oven 22 from either DC power or external AC line power on line 16. The microwave oven has as standard equipment those network portions delineated by dashed lines 60 and 62. Thus, within network portion 60 AC line power is normally supplied along lines 64, 66 through a fuse 68, an oven thermostat 70, interlock switches 46, 48 to drive a magnetron 33 by way of a high voltage output transformer 70, high voltage capacitor 72 and diode 74. A low AC voltage filament heater winding 76 is normally included in output transformer 70. The external AC line power also provides suitable low AC voltage power with a transformer 80 to produce the DC voltage needed for the digital control circuit 36 used to control the microwave oven 22.

Operation of microwave oven 22 from a DC supply is obtained with the inclusion of a lower power DC to AC inverter 100 which produces across its transformer output lines 102, 104 an internal AC line power with the voltage and frequency needed to operate the circuitry inside network portion 60 as well as the drive for a large power DC to AC inverter 106. This inverter delivers AC power through an additional winding 108 of transformer 70 to generate the high voltage on output winding 110 for magnetron 33.

A relay 112 having its coil 114 connected across external AC lines 24, 24', controls multiple switches 116, 118, 120 and 122. These switches are so connected that in the absence of activating AC power on lines 24, 24', electrical power for operation of the microwave oven is obtained from battery 28. As soon as external AC line power is applied, however, relay 112 senses this and activates its coil 114 to cause switches 116-122 to connect external AC line power to the microwave components inside network 60 and to the output transformer 70 through interlock switches 46 and 48.

When only DC power is available, and circuit breaker 126 is closed, inverter 100 generates relatively low internal AC line power that is sufficient to activate the DC control 36 (see FIG. 2), the oven lamp 34, fan motor 35 and the drive for power inverter 106. The latter inverter is so designed that it requires the presence of the internal AC power to produce an AC power signal through primary transformer winding 108. Hence, if an interlock switch, 46 or 48, is opened, power from inverter 106 is immediately extinguished.

The internal AC power inverter 100 can be made of well-known, low-cost components and need not produce a large amount of AC power, usually less than about 60 watts. Generally about 35 watts will be sufficient. The internally-generated AC power has, for the U.S. market, an AC line voltage of about 110 volts at a frequency of 60 Hz. and may be in the form approaching a square wave rather than a sine wave as shown with curve 130 in FIG. 6. For foreign markets, a voltage of about 220 volts at 50 Hz. is generated to correspond with local line power standards. The internal AC line power is, as shown in FIG. 5, passed through a 10 to 1 reduction transformer 140 whose secondary winding 142 is coupled to a zero cross-over detector 144 and a rectifier 146. The output 148 of rectifier 146 is applied through a filter 150 to provide a DC voltage source for the several logic circuits used in inverter 106.

The zero cross-over detector produces on its output 152, a pulse each time that the AC signal across winding 142 crosses a zero reference level 154.

This pulse is then applied to a frequency doubler network 154 whose opposite outputs 156, 185 provide pulses as shown respectively by curves 156' and 158'. Frequency doubler network 154 may be formed of a D flip flop 160 that has an output 158 coupled through an adjustable timing circuit 162 to its reset input R. The timing circuit is adjusted to about one fourth of the 60 Hz. period of the internal AC line power. This doubles the input signal frequency as shown with curves 156', 158'.

The positive transitions of both outputs 156 and 158 from the frequency doubler are then used to clock a flip flop 166 by way of a differentiating network 168. When the Q output 170 of flip flop 166 goes to an active state, a capacitor 172 is allowed to charge as shown by curve 172' in FIG. 6. The rate at which capacitor 172 charges is controlled by the adjustment of a potentiometer 176 and the voltage across a capacitor 178 that is coupled to the output 148 of rectifier 146. Since the voltage across capacitor 178 is a function of the voltage of the battery 28, a regulation of the output power as a function of input voltage DC is obtained.

Thus, a higher battery voltage results in a faster charge of capacitor 172 and thus an earlier reset of flip flop 166. The potentiometer 176 is adjusted so that the time required to charge capacitor 172 to the reset value corresponds to the duty cycle needed to deliver rated power to the magnetron 33 (see FIG. 4). The output 170 of flip flop 166 thus follows a curve as shown at 170' in FIG. 6 with the width, w, of pulses 180 being modulated to determine the amount of power to the magnetron 33.

The output 170 of flip flop 166 is applied to inputs of two and gates 182, 184 which have other inputs respectively connected to doubler network output lines 156, 158. The outputs 186 and 188 of the AND gates provide gating signals to banks 190, 192 of parallel connected FET switches. Banks 190, 192 are respectively connected between the ends of output transformer winding 108 and the battery return terminal. Each bank of FET switches is provided with a suitable protection circuit as is well known in the art.

During operation, the banks 190, 192 of FETs are alternately turned on and off. This alternately pulls either side of the transformer primary winding to ground. Each FET bank 190 and 192 includes a voltage snubbing circuit that turns on the "off" FET bank when the flyback of a released transformer primary leg exceeds the voltage rating of a snubbing zener diode. This prevents the drain-to-gate voltage rating of the various FETs from being exceeded.

Referring to FIG. 5, with an inverter circuit 106, a minimum input signal is needed to deliver electrical power to the magnetron 33. A minimum square wave input voltage at the primary winding of input transformer 140 is required before the circuit can operate, for example, at least 90 volts rms. An input signal frequency of greater than 50 Hz. is required lest the high voltage transformer 70 is driven into saturation and blows the fuse or circuit breaker.

Figure 7:
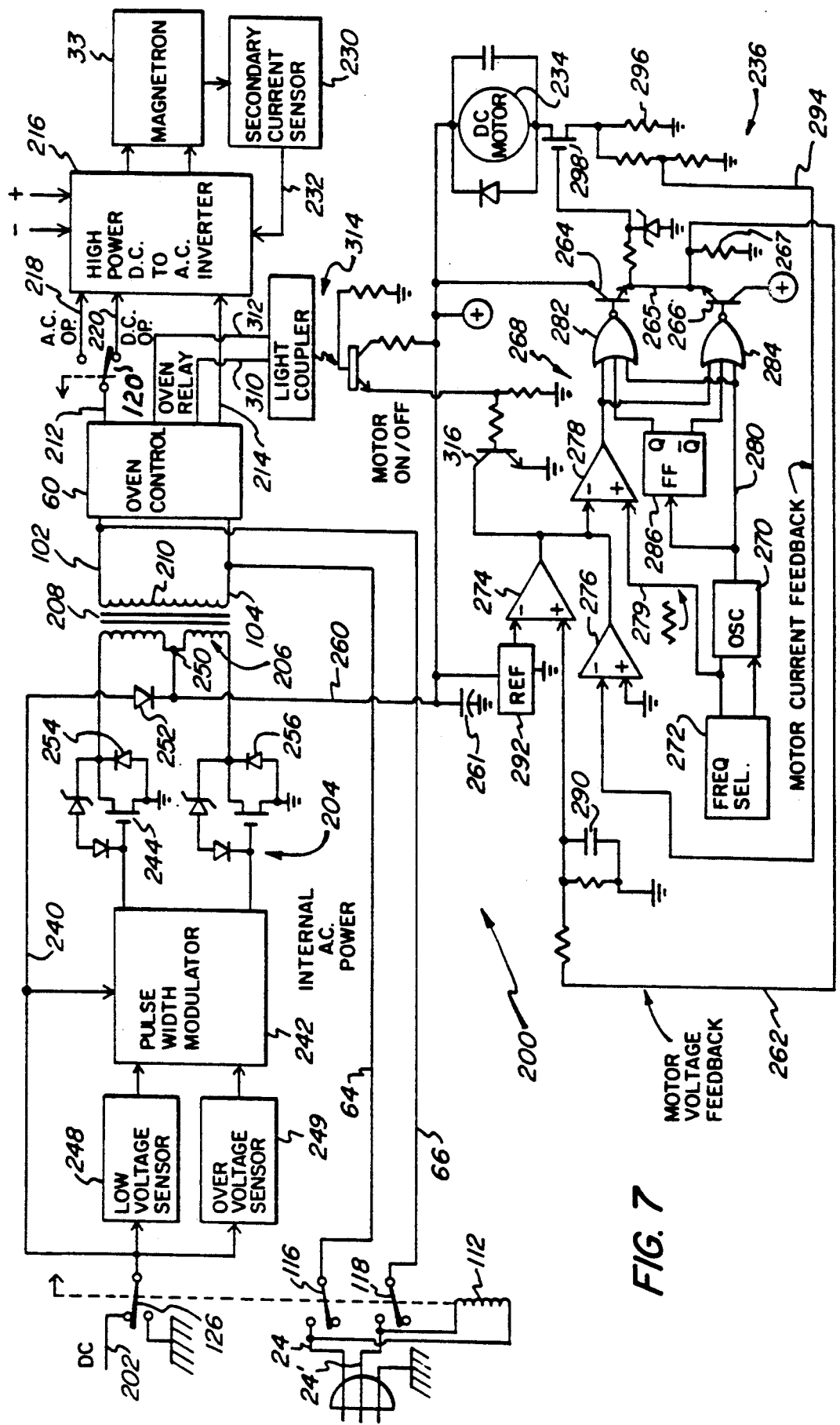
FIG. 7 is an alternate schematic block diagram for an alternate power inverter used in the microwave oven of this invention.

In the circuit of FIG. 7, an internal AC power inverter 204 is provided that delivers AC power to a primary winding 206 of a transformer 208. Its secondary winding 210 delivers AC power along lines 102, 104 to oven control 6 that includes the interlock switches as described with reference to FIG. 4.

AC power from the external AC lines source is obtained through the AC relay-controlled switches 116, 118 as previously described and applied in parallel with lines 102, 104 from the secondary winding 210 of the internal AC power output transformer 208 leading to oven control 60. In the embodiment of FIG. 4, the lines 102, 104 are respectively connected to lines 64, 66 in oven control 60.

Figure 8:
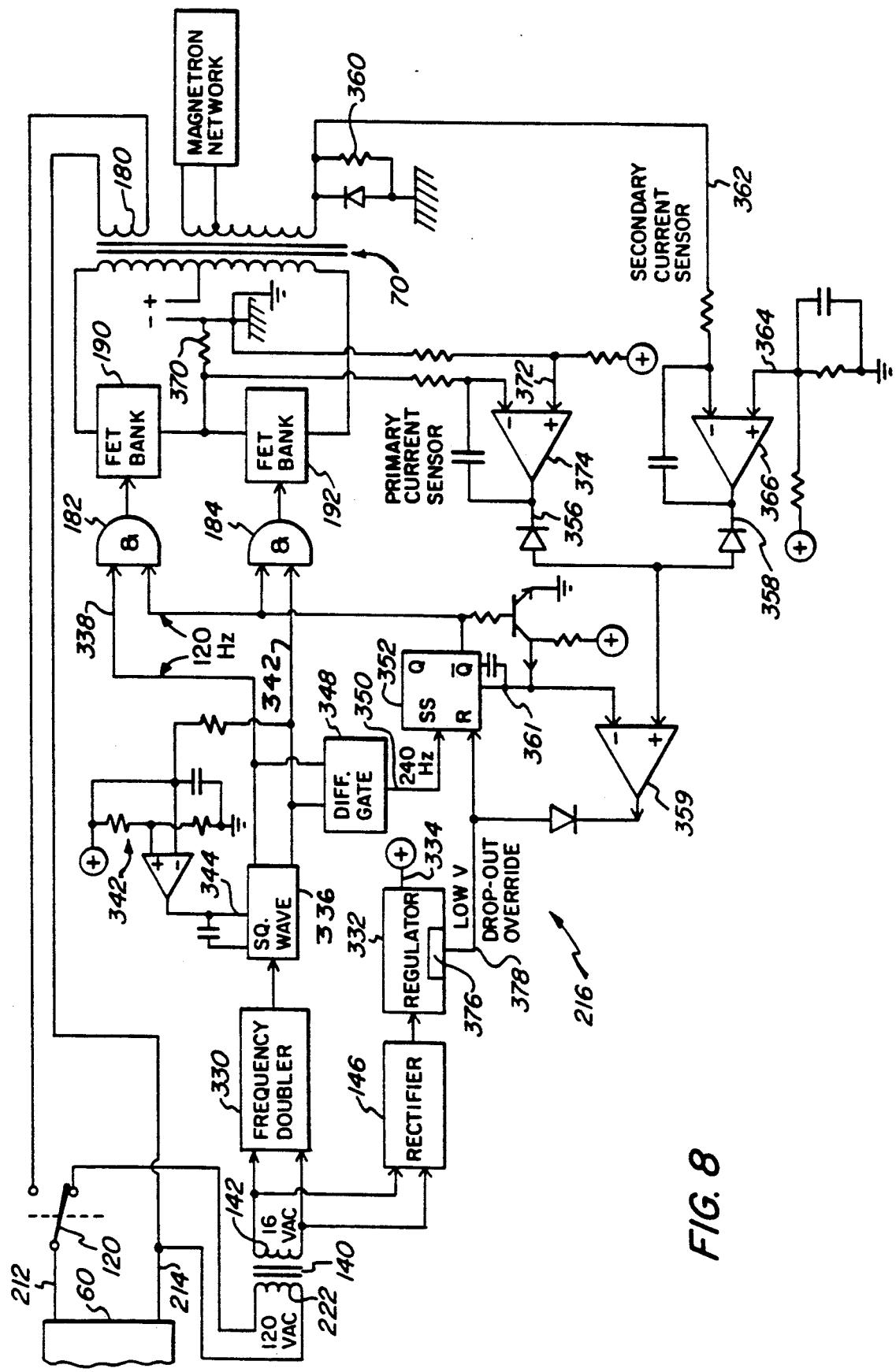
FIG. 8 is a schematic block diagram for an alternate power inverter used in the microwave oven of this invention.

The AC power appearing on lines 212, 214 from oven control 60 are applied to a high power inverter 216 whose function is the same as that for power inverter 106. As also shown in FIG. 8, line 212 is coupled through switch 120 to either line 218 connected to winding 108 of power transformer 70 or to line 220 connected to primary winding 222 of input transformer 140 in power inverter 216.

Output power is delivered to a magnetron 33 using the components as described with reference to FIG. 4. A sensor 230 is used to produce a signal that is indicative of the magnetron voltage actually generated. The current sensor 230 provides a control signal on line 232 to power inverter 216 so as to maintain a desired magnetron power level.

A permanent magnet DC fan motor 234 is preferably used, because of its relatively high efficiency, to cool the electronic components and its speed is controlled by a regulator 236 Other efficient DC motors can be used such as a typical car heater motor.

In the circuit of FIG. 7, relay 112 controls switches 116, 118, 120 and 126. Thus in the DC power mode, DC line 202 is coupled by line 240 to low power inverter 204, high power inverter 216 and motor regulator 236. In the DC power mode switches 116, 118 and 120 are open and switch 126 is placed in the DC operational position as shown. In the AC power mode switch 126 is open and AC line power is delivered to the input of oven control 60 while switch 120 is moved by relay 112 to an AC operational position.

The internal AC power source 204 includes a pulse width modulator 242 that alternately switches FET's 244 and 246 on in a push-pull mode and off at a duty cycle selected to provide a desired AC power at about 120 volts across secondary winding 210. A conventional chip, known as the LM3524, can be used to provide the pulse width modulation. A low voltage sensor 248 and overvoltage sensor 249 are employed to shut down operation of the modulator 242 for respectively excessively low and high voltage levels of the DC battery supply.

The FETs 244, 246 are respectively coupled to opposite ends of primary windings 206 which has a center tap 250 connected to the cathode of a diode 252 whose anode is connected to DC power on line 240. Hence, alternate conduction of FETs 244, 246 causes the generation of AC power at about 120 volts across secondary winding 210.

Conversely, when AC line power is applied to lines 102, 104 in the AC powered mode, a low AC voltage of about 16 volts is developed across each half of the primary winding 206. Since the FETs, by virtue of conventional practice, are protected against high reverse potentials by body diodes 254, 256, a full wave rectified DC potential is produced at the center tap 250. This potential is delivered along line 260 and filtered by capacitor 261, to operate DC motor 234 and speed regulator 236.

The speed of DC fan motor 234 is maintained at a level deemed desirable for cooling of components. When the input DC voltage drops, DC motor speed is kept constant with regulator 236. Speed regulator 236 generates a signal representative of the voltage across motor 234 at line 262. This is derived from a resistor 267 that is in parallel with a pulse-width modulated motor drive signal on the output 265 of parallel switches 264, 266.

The pulse width modulated signal is obtained with a pulse width modulator 268 that is formed with an available semiconductor chip such as the LM3524. The pulse width modulator 268 includes an oscillator 270, an external frequency selection network 272, comparators 274, 276 and 278 which are connected as shown. The output of oscillator 270 is on line 280 and delivers a square wave to gates 282, 284 and to the clock input of flip flop 286.

The motor voltage feedback signal on line 262 is averaged by capacitor 290 and then compared with a voltage from a reference source 292 by comparator 274. A signal representative of the current through DC motor 234 is presented on line 294 and is derived by way of resistor 296 that is in series with FET switch 298. The current signal is compared by comparator 276. The outputs of comparators 274 and 276 are combined and applied to one input of comparator 278 while a triangular wave generated on line 279 at the timing mode oscillator 270 is applied to the other input. The output of comparator 278 is a pulse width modulated signal that is applied to inputs of gates 282, 284.

In the operation of regulator 236, the DC motor 234 has a speed that is obtained for an average voltage across DC motor of about ten volts. When current flow through DC motor 234 exceeds a threshold incorporated into comparator 276, the output of comparator 276 causes an override signal to comparator 278 so as to reduce the width of the pulses to the motor, thus reducing surge currents when the motor starts up.

Since the cooling fan motor 234 is operated from power that does not run through the oven control 60, it is desirable to provide an enabling control whereby the fan only runs when the magnetron 33 is on. For this, an enabling signal is obtained from inside the oven control 60, for example by use of additional switches on relay B in FIG. 4 or on a timer. This signal is supplied on lines 310, 312 through an optical coupler 314 to activate a control switch 316. As long as a signal is present on lines 310, 312, and the signal is kept on as long as magnetron 33 is on, switch 316 is kept open. As soon as the oven control requires an end to a cooking cycle, the enabling signal is removed and switch 316 is allowed to close.

Closure of switch 316 prevents the delivery of duty cycle pulses from comparator 278 whose output disables gates 282 and 284 to prevent operation of DC motor 234.

The high power inverter 216 described with reference to FIG. 7 has been altered from the power inverter shown in FIG. 5 as can be more clearly seen with respect to FIG. 8.

Activation or inverter 216 depends upon the position of switches controlled by relay 112 (see FIGS. 4 and 7). The 120 volt, 60 Hz AC power available on lines 212, 214 whether from a line source 16 (see FIG. 4) or from the internal AC power source 100 or 204 is stepped down by transformer 140 to a low voltage in the range from about 13-20 volts. This is then passed through a frequency doubler 330 to produce 120 Hz pulses such as in the manner provided by the networks 144, 154 of FIG. 5. After formation of an unregulated DC voltage by rectifier 146, a regulator 332 is used to establish a regulated DC voltage of about ten volts on output 334 for powering the controls and pulse generating circuits in inverter 216.

The single shot pulse generator 336 transforms the input pulses into complementary 120 Hz square waves on lines 338, 340. A stabilizer network 342 is used in a feedback loop to maintain the square wave despite input voltage fluctuations and to compensate for component tolerances. The feedback point for network 342 is the timing node 344 for pulse generator 336.

The rising edges of the square waves on lines 338, 340 are detected by differentiating gate 348 to produce pulses at a 240 Hz rate on output line 350 to activate pulse generator 352. The latter produces a timing pulse that is varied to produce a pulse width modulated output pulse on line 354. This pulse width is modulated as a function of the lesser of two integrated error signals on lines 356, 358 respectively. These lines are combined as an input to a comparator 359. The triangular waveform from timing node 361 of pulse generator 352 is applied to the other input to comparator 359.

One error signal is derived from a sensing of the input power to the magnetron. This input power is derived with a small resistance 360 sensing the magnetron current. Since the magnetron operating voltage is relatively constant, the average voltage developed across resistor 360 during the half-cycles corresponding to magnetron conduction is a good measure of this input power. The voltage on line 362 is compared with a reference value on line 364 by a comparator 366 to produce an error signal on line 358.

The other error signal is representative of an excessive current load on the battery. This is obtained with a shunt resistance 370 that is of the order of 1 milli-ohm. The voltage developed across resistor 370 is compared with a reference value on line 372. This reference represents a maximum allowable current load from the battery, say 80 amperes., above which the output 356 from comparator 374 goes sharply negative and causes a pulse width reduction by way of comparator 359.

Another protective feature is obtained from regulator 332 which includes a conventional sensing network 376 to detect an excessively low input voltage from rectifier 146. This initiates a drop out signal on line 378 to inhibit pulses from generator 352 as long as this low voltage condition exists.

With the power inverter 216, problems associated with destabilizing temperature conditions, low voltages, excessive battery loads and inadequate power drive of the microwave generator are advantageously either avoided or significantly reduced. The use of a high efficiency DC motor and its convenient DC drive 236 enhances the compactness of the microwave oven control 200.

Hence, with a microwave oven in accordance with the invention, the internally-generated AC power signal must be present at the power inverter 106 for it to supply power to the magnetron. If the internal input signal is interrupted, such as by opening of the oven door, power flow to the magnetron immediately stops. This protective feature is obtained by retaining established interlocks and safety features built into existing standard microwave ovens and without requiring that a full power high DC current for the magnetron be passed through the interlocks.

Having thus described a preferred embodiment for a microwave oven in accordance with the invention, the advantages of the invention can be appreciated. Variations from the described embodiment can be made since this is presented to illustrate the invention. For example, it is possible to build a microwave oven in accordance with the invention without the ability to use external AC power. In such case, the relay 112 with its switches 116–122 can be dispensed with. Other types of power inverters can be used, provided, however, that they require an input power signal to deliver electrical power to the magnetron.

What is claimed is:

1. A microwave oven capable of operating from external AC line power as well as from DC input power available on transports, comprising:

a microwave oven housing enclosing a heating chamber and having, a door for access to the chamber, a source of microwave energy, interlock safety means for preventing external radiation of microwave energy when the door is opened and enabling energizing of the microwave source when the door is closed, said interlock safety means having an input side and an output side;

first inverter means for generating internal AC power from DC input power, and delivering said internal AC power to the input side of the interlock safety means;

switch means for connecting either the AC line power tot he input side of the interlock safety means or the DC input power to the first inverter means;

means responsive to either, internal AC power or external AC power, available at the output side of the interlock safety means for generating a high voltage power for energizing the microwave source, said high voltage power generating means including power inverter means for generating said high voltage power from said DC input power;

whereby said source is energized with high voltage produced from either said DC input power or said external AC line power as long as said internal AC power or said external AC line power passes through said interlock safety means so as to preserve the safety provided thereby.

2. The microwave oven as claimed in claim 1 wherein said first inverter means includes an output transformer having a primary winding and a secondary winding, said secondary winding being coupled to the input side of the interlock safety means to provide said internal AC power thereto and being coupled to said switch means to provide AC line power to the input side of the interlock safety means.

3. The microwave oven as claimed in claim 2 wherein said microwave oven includes a DC fan motor; and means coupled to the primary winding of the output transformer to provide DC power to said DC fan motor independent of a connection made by said switch means.

4. The microwave oven as claimed in claim 3 wherein said primary winding has a center tap that is connected to said switch means to receive DC input power therethrough, and push-pull operated switches coupled to the primary winding to generate said internal AC power and body diodes respectively connected across the push-pull operated switches for their respective protection and to rectify AC power that is reversely coupled from the secondary winding to provide DC power for the DC fan motor.

5. The microwave oven as claimed in claim 4 wherein the oven has a control and further comprising:

means coupled to the oven control for generating a control signal to control the operation of the DC fan motor, said control signal being effectively connected to regulate operation of the DC fan motor.

6. The microwave oven as claimed in claim 5 and further including:

means for regulating said DC fan motor, said regulating means being responsive to said control signal.

7. The microwave oven as claimed in claim 6 wherein the regulating means includes:

means for generating a motor voltage signal representative of the voltage across the DC fan motor, and means responsive to the motor voltage signal for maintaining the DC voltage applied to the DC fan motor at a desired level.

8. The microwave oven as claimed in claim 7 wherein the power inverter means includes means responsive to the internal AC power for generating trigger signals and coupling the trigger signals to actuate the power inverter means.

9. The microwave oven as claimed in claim 8 wherein said means for generating said trigger signals generates said trigger signal at twice the line frequency of the internal AC power.

10. The microwave oven as claimed in claim 1 wherein the means for generating said high voltage power includes:

means for generating a source voltage signal representative of the voltage applied to the microwave source;

means for generating a current signal representative of the magnitude of the current being drawn to operate the microwave source from the DC input power;

means responsive to said source voltage signal to maintain a desired high voltage level to said microwave source; and means responsive to said current signal to inhibit operation of the microwave source when the current being drawn from the DC input power exceeds a predetermined maximum level.

* * * * *